United States Patent
Mehr-Ayin et al.

[11] Patent Number: 5,555,722
[45] Date of Patent: Sep. 17, 1996

[54] INTEGRATED APU

[75] Inventors: Kourosh Mehr-Ayin, Vista; W. J. Bialas, San Diego; James A. Smith, Escondido, all of Calif.

[73] Assignee: Sundstrand Corporation, Rockford, Ill.

[21] Appl. No.: 153,237

[22] Filed: Nov. 15, 1993

[51] Int. Cl.$^6$ .................................................. F02C 7/26
[52] U.S. Cl. .................................. 60/39.142; 60/39.141; 290/36 R; 310/113; 123/179.28
[58] Field of Search .......................... 60/39.141, 39.142, 60/39.281; 290/22, 36 R; 310/113; 123/179.28

[56] References Cited

U.S. PATENT DOCUMENTS

| | | | |
|---|---|---|---|
| 3,590,262 | 6/1971 | Sheffield | 290/46 |
| 4,456,830 | 6/1984 | Cronin | 123/179.28 |
| 4,473,752 | 9/1984 | Cronin | 123/179.28 |
| 4,506,163 | 3/1985 | Stevens | 290/36 R |
| 4,713,982 | 12/1987 | Fluegel et al. | 60/39.142 |
| 4,743,776 | 5/1988 | Baehler et al. | 290/22 |
| 4,815,278 | 3/1989 | White | 60/39.281 |
| 4,845,944 | 7/1989 | Rodgers | 60/39.142 |
| 5,184,456 | 2/1993 | Rumford et al. | 60/39.142 |
| 5,253,470 | 10/1993 | Newton | 60/39.141 |

*Primary Examiner*—Charles Freay
*Attorney, Agent, or Firm*—Ryan M. Fountain

[57] ABSTRACT

An integrated APU is provided having a combined starter/generator device mounted within the gearbox housing so as to reduce the number of reduction gears, bearings and other redundant components sufficiently to eliminate the need for a separate lubrication oil scavenger pump as well. Further integration and savings can be achieved by de-coupling the fuel pump and lubrication pump from the gearbox and driving those pumps instead by an electric motor.

6 Claims, 5 Drawing Sheets

INTEGRATED APU

BACKGROUND AND SUMMARY OF THE INVENTION

The present invention relates generally to generation of electric power and, more particularly, to a method and apparatus for increasing reliability in high altitude starting of aircraft auxiliary power units having gas turbine engines.

Gas turbine engines have typically been employed as auxiliary power units (APUs) in aircraft to provide, for example, a.c. electric power. In conventional APUs, the gas turbine engine has a rotatable drive shaft which is connected to a gear box for transferring motive force to and from the drive shaft. The gear box often includes a variety of speed reduction gears and pads to connect to various accessories. These accessories can include the APU fuel pump, exhaust fan, starter motor, a.c. output generator and gear box lubrication pump. The starter motor can be driven by d.c. current from aircraft batteries or, more recently, from various a.c. current sources.

For safety reasons, it has been important that APUs start quickly and reliably when the aircraft is operating at high altitudes. Due to the size and complexity of the conventional gear box, its lubricating oil would impose a significant vicious drag against high altitude starting. To overcome that drag, a substantial amount of electric power would be required by the starter motor. To avoid that power drain and its potential detrimental effect on other aircraft electric power systems, it has been suggested to employ air/oil separation devices and lubrication oil scavenge pumps for removing lubricating oil from gear box components during APU shut down.

However, adding such components increases both the cost and weight of APUs. Further, in order to avoid viscous drag problems associated with starting the lubrication pump it may be necessary to include a de-priming valve for that pump, thus also increasing APU weight.

In general, prior APUs also evolved toward a line replaceable unit (LRU) configuration where many functional components were separately housed and independently replaceable. The advantage of these configurations was intended to be in repair cost savings since a deficiency in one part could be resolved quickly and without the cost of or replacement time for the entire APU. However, as more and more parts have been added to improve and extend APU performance, the APU weight has significantly increased, due to not just the functional parts, but also their associated housings, bearings, etc. Moreover, it has been found that certain failures of these LRU parts still detrimentally affect adjacent parts such that replacement of the several adjacent parts is typical with replacement of the initially failing part. For example, failure of the starter motor can cause contamination of the gear box, requiring dissociation of all accessories and loads.

Another disadvantage in some prior APUs arises with the incorporation of the APU fuel pump with the gear box. Briefly, to minimize overall weight it has been suggested to drive the fuel pump off of the drive shaft of the gas turbine engine with a speed reduction gear therebetween. Thus, the fuel pump speed is controlled by the drive shaft speed. In order to assure quick starting, the fuel pump has often been sized to provide the optimum fuel supply at low APU speeds. However, at high speeds a lower proportion of fuel is needed. Therefore, some prior APUs either bypassed the excess fuel or burned too rich an air/fuel mixture in the combustion chamber of the gas turbine engine. Bypassing the excess fuel again increases system weight, cost and complexity and also unnecessarily heats the fuel supply.

Accordingly, it is an object of this invention to provide improvements in the generation of electric power. Further objects include, but are not limited to, the provision of a method and apparatus for:

1. more reliable high altitude starting for aircraft APUs,
2. decreased aircraft APU weight,
3. decreased aircraft APU initial and servicing costs,
4. decreased aircraft APU fuel consumption,
5. streamlined construction, operation and maintenance of APUs,
6. greater operational control over APUs,
7. decreased APU spacial requirements, and
8. improved APU operational efficiency.

These and other objects of the present invention are attained by the provision of an integrated APU having a combined starter/generator device mounted within the gearbox housing so as to reduce the number of reduction gears, bearings and other redundant components sufficiently to eliminate the need for a separate lubrication oil scavenger pump as well. Further integration and savings can be achieved by de-coupling the fuel pump and lubrication pump from the gearbox and driving those pumps instead by an electric motor.

Other objects, advantages and novel features will become readily apparent from the attached drawings and detailed description below.

DESCRIPTION OF PREFERRED EMBODIMENTS

Figure 1A:
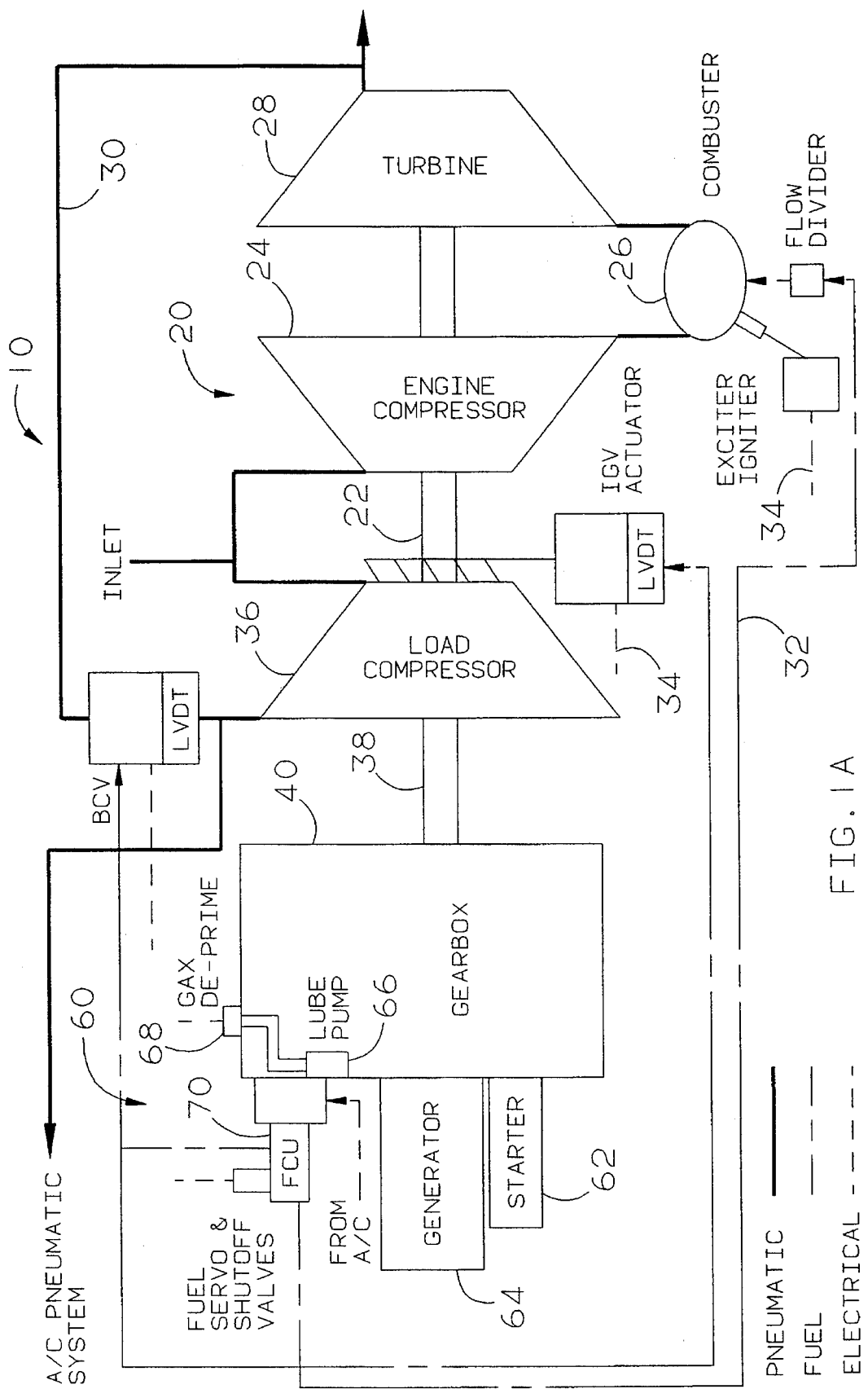
FIG. 1A shows schematically a prior aircraft APU arrangement.
Figure 1B:
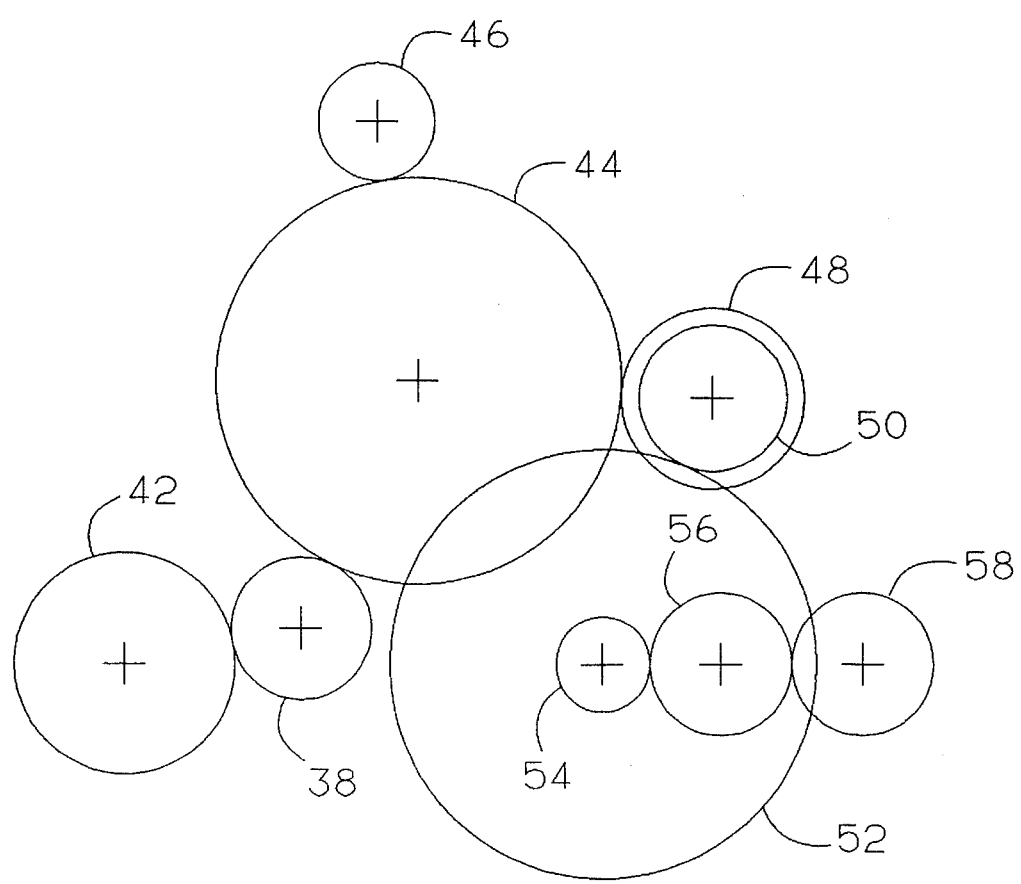
FIG. 1B shows schematically a prior geartrain arrangement disposed within the gear box of the APU of FIG. 1A.

By way of background, FIGS. 1A and 1B generally reference a conventional aircraft APU arrangement 10 having as its prime mover a gas turbine engine portion 20, a gearbox 40, and an accessory portion 60. Engine portion 20 includes a drive shaft 22, engine compressor 24, combustor 26 and turbine 28. Pneumatic lines 30, fuel lines 32 and electrical lines 34 of a conventional nature connect the components of engine portion 20 with other components of arrangement 10. Load compressor 36 is coupled to drive shaft 22, and end portion or extension 38 of drive shaft 22 serves as an input to gear box 40.

As seen from FIG. 1B, the geartrain within gearbox 40 includes ten different gears to drive the accessories and loads applied to gearbox 40. Typically, extension 38 of drive shaft 22 is received within gearbox 40 and engages with generator gear 42 and idler 44. An air/oil separator of conventional nature is preferably included in idler 44. At the same time, idler 44 is connected to exhaust fan gear 46 and starter motor gear 48. A permanent magnet generator is, for example, mounted with respect to fan gear 46 so as to monitor and detect an overspeed condition of drive shaft 22. Fuel pump drive gear 50 is coaxially mounted with respect to motor gear 48 and engages pump stack/fuel control gear 52. Pump drive gear 54 is coaxially mounted with respect to gear 52 and engages general scavenger pump gear 56, which in turn engages lubrication oil pump gear 58.

Accessories 60 include starter motor 62, electric current generator 64, lubrication oil pump 66, de-prime valve 68, and fuel pump control unit 70. Motor 62 typically runs on at least d.c. current. Generator 64 typically produces a.c. current. Briefly, in operation, motor 62 initially drives extension 38 and drive shaft 22 to cause rotation of the compressors 24 and 36 and turbine 28 until fuel ignition begins within combustor 26. After that ignition, drive shaft 22 and extension 38 reverse the application of motive force and cause generator 64 to convert that motive force into a.c. current for use in desired aircraft operations.

According to the teachings of the present invention, certain APU components are combined into an integrated unit to reduce weight, improve APU performance and simplify construction. In that regard, all the figures herein share a common numbering of components wherein like elements bear like numbers. Specially adapted elements embodying the principle teachings of this invention are, however, numbered distinctly.

Figure 2A:
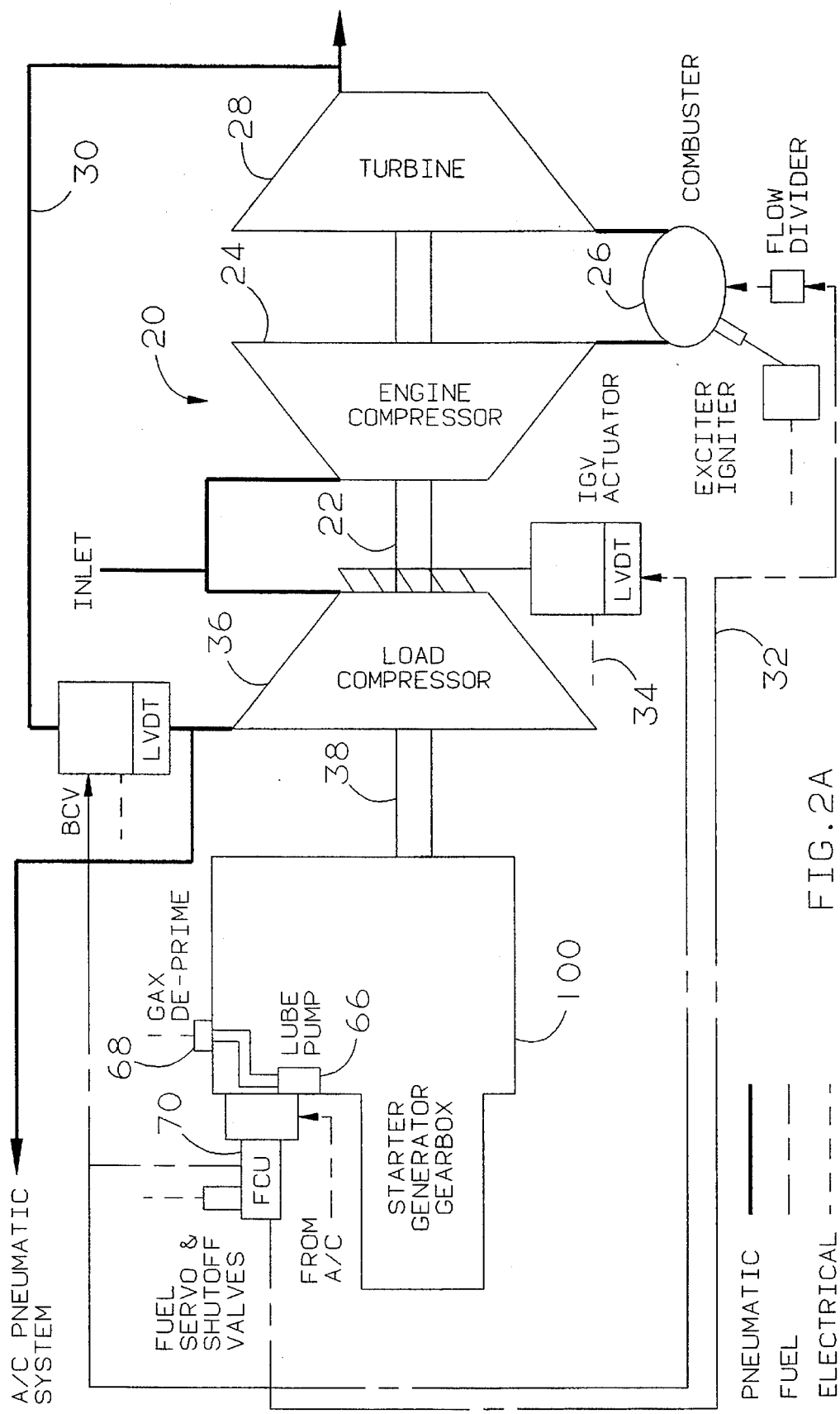
FIG. 2A shows schematically an integrated aircraft APU according to the present invention.
Figure 2B:
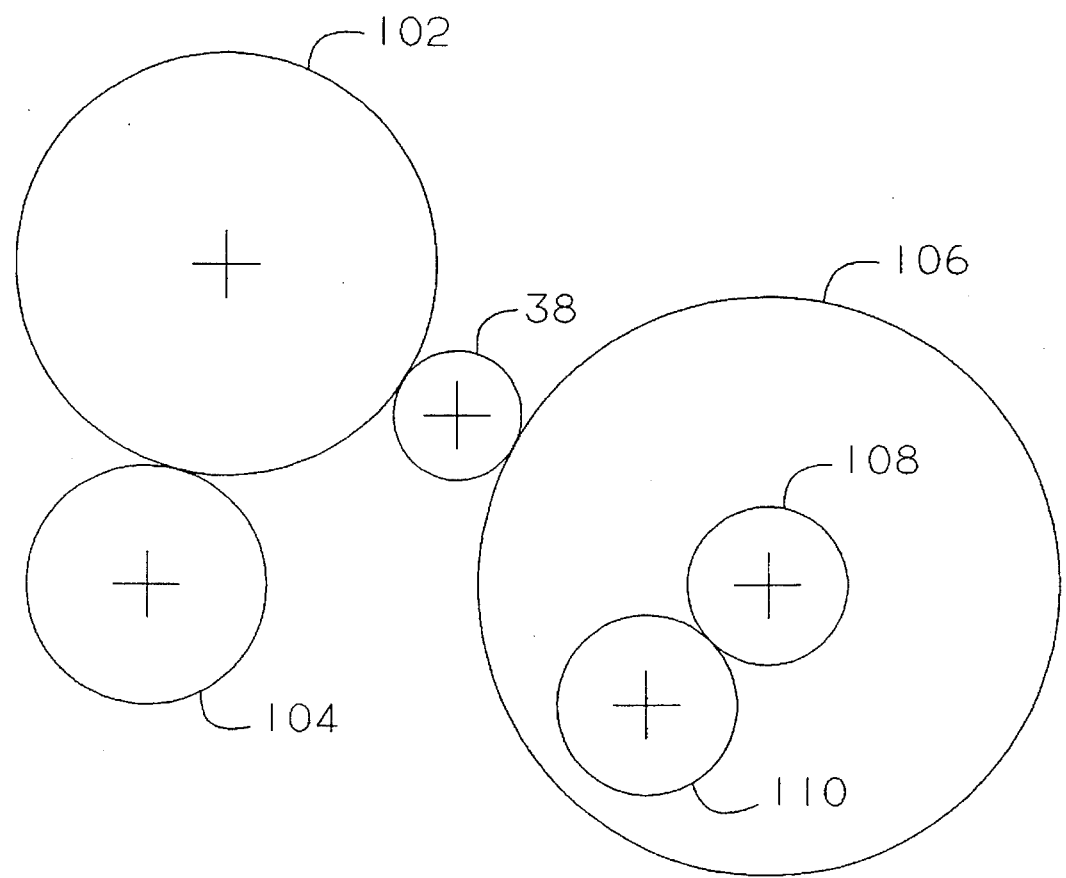
FIG. 2B shows schematically a geartrain arrangement disposed within the gearbox of the APU of FIG. 2A.

Turning next to FIGS. 2A and 2B, the APU arrangement includes integrated starter/generator/gearbox unit 100 instead of gearbox 40, motor 62 and generator 64. Unit 100 comprises a common housing 101 for all elements therein and a shared arrangement of components, such as bearings, etc. Unit 100 is preferably readily separable from engine portion 20 for repair and is held in operational position by conventional bolts. Specifically, instead of a separate starter motor and generator, each in separate housings and separately attached to the gearbox housing, a single, integrated starter/generator unit is employed. This starter/generator unit can be of a previously known nature, having a single electrodynamic rotatable structure with a common main field rotor and respective stator windings mounted aboard a drive shaft (not shown) to perform both the starter motor and current generator functions. Unlike prior starter/generator units, however, no separate housing and bearing structure is employed for that unit as a whole. Instead, the starter/generator unit is incorporated into the gearbox housing and shares common bearings 103 and components therein.

As shown in FIG. 2B, this integration into the gearbox provides a significant reduction in geartrain components. Extension 38 is connected to reduction gear 102 having a conventional air/oil separator thereon and permanent magnet generator which, for example, can serve to sense the speed of drive shaft 22, sense the position of the starter/generator drive shaft and supply power to the generator control portion of the integrated starter/generator. Gear 102 is in turn connected to starter/generator gear 104. The drive shaft of the starter/generator is connected to gear 104. At the same time, extension 38 drives idler 106 which is coaxially mounted with fuel pump stack gear 108. Further, lubrication oil pump gear 110 is connected to gear 108. In this embodiment the exhaust fan and its associated gear 46 have been replaced by a previously known oil cooling system having an exhaust eductor.

Integration of the starter, generator and gearbox into a single unit eliminates the need for a starter clutch, reduces mechanical energy losses, and increases operation reliability. Supply and scavenge lubrication components are similarly shared within the overall unit instead of using separate components within the starter, generator and gearbox. Further, such integration significantly reduces the size of the APU as well as its weight. Thus, given the spacial constraints of APU mounting in aircraft and other vehicles, installation, repair and maintenance can be simplified.

Figure 3B:
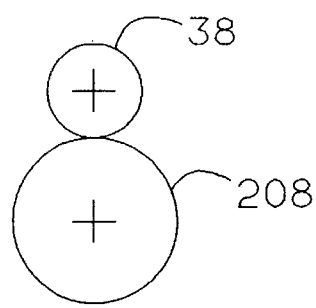
FIG. 3B shows schematically a geartrain arrangement disposed within the gearbox of the APU of FIG. 3A.
Figure 3A:
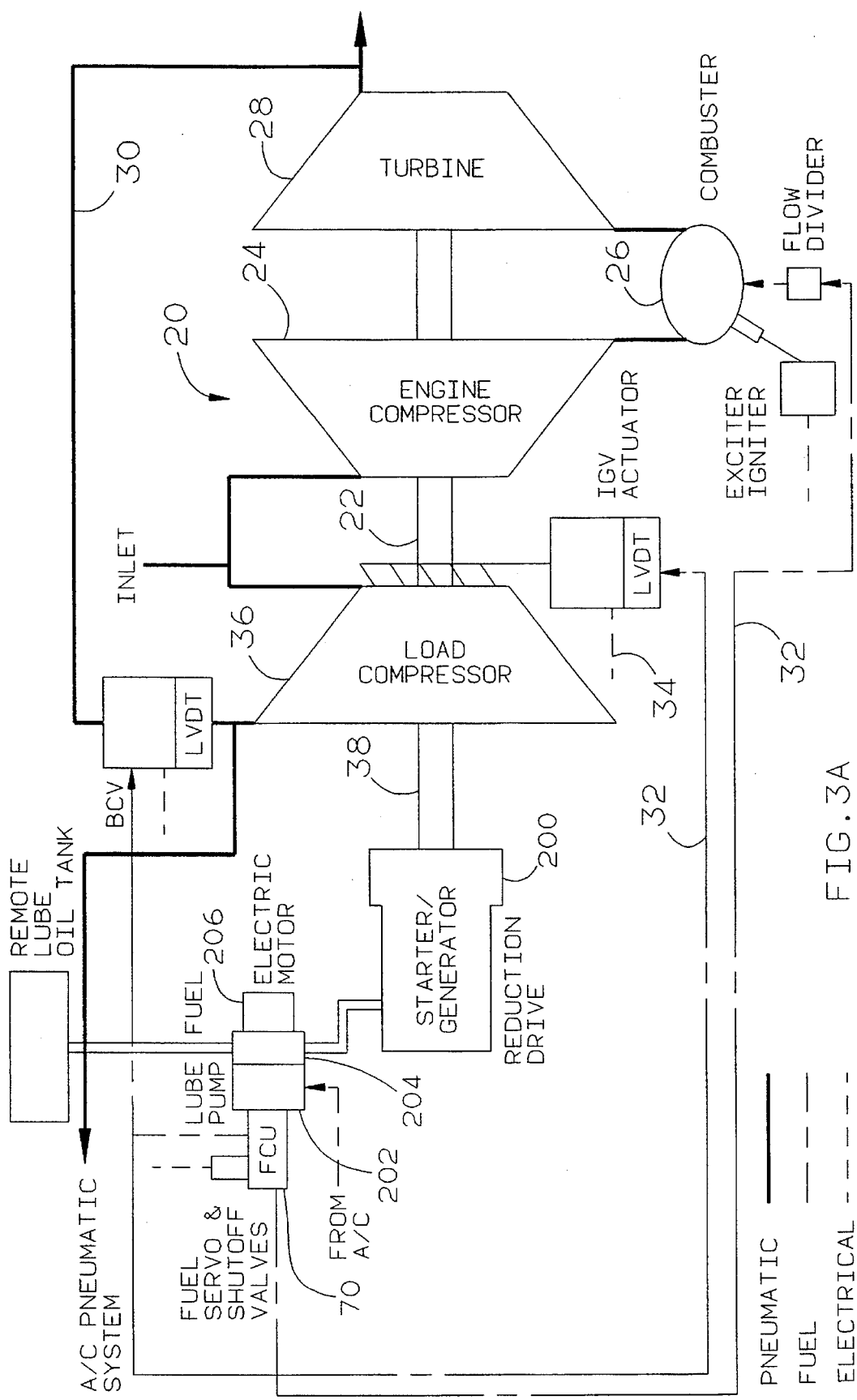
FIG. 3A shows schematically an alternative integrated aircraft APU according to the present invention.

FIGS. 3A and 3B show another embodiment of the present invention wherein the starter, generator and gearbox functions are further integrated to a direct reduction drive with a minimal geartrain. Specifically, integrated starter/generator/gearbox 200 is provided instead of gearbox 40, motor 62 and generator 64. Unit 200 comprises a common housing 201 for all elements therein and a shared arrangement of components as with unit 100, except that the lubrication and fuel pump functions are uncoupled from the motive power transmitted by the geartrain. Lubrication pump 202 and fuel pump 204 are provided as separate elements without mechanical connection to drive shaft 22. Instead, electric motor 206 is included to drive both of those pumps. Thus, the APU fuel and lubrication systems can be controlled independently of the APU mechanical speed.

This arrangement permits use of a smaller fuel pump and can avoid fuel recirculation. Also, since APUs typically require low fuel flow during starting, electric motor 206 can be operated at low speed, significantly reducing the torque and power consumption caused by the vicious drag of the lubricating oil. Accordingly, use of a de-prime valve for the lubrication pump can be avoided during starting.

Within the geartrain itself, only a starter/generator gear 208 is connected to extension 38. Gear 208 preferably includes an air/oil separator and a multifunction permanent magnet generator. Again, such an arrangement can provide substantial savings in weight, cost and size. Depending upon the extent of such integration selected, the present invention is estimated as permitting weight savings in excess of 10% of the APU weight.

Although the present invention has been described above in detail with respect to certain preferred embodiments, the same is by way of illustration and example only, and not to be taken as a limitation. The spirit and scope of the present invention are limited only by the terms of the attached claims.

What is claimed is:

1. An apparatus, attached to a prime mover having a rotatable drive shaft, for providing initial motive force through said drive shaft to initiate power generation from said prime mover and thereafter to derive electric current from said prime mover, said apparatus and said prime mover being separably mounted to a common support structure, and said apparatus comprising:

a housing which is removable from said support structure independently of said primed mover, including therein a common bearing means for serving as a shared bearing between other components within said housing;

a starter/generator means mounted within said housing and supported by said common bearing means;

said starter/generator means having at least a d.c. input and an a.c. output; and reduction gear means, mounted within said housing and supported by said common bearing means, for connecting said starter/generator means to said drive shaft and transmitting rotational force therebetween.

2. The apparatus according to claim 1 wherein said starter/generator also has a rotatable drive shaft and further including a common permanent magnet generator mounted within said housing to sense prime mover drive shaft overspeed and the position of the starter/generator drive shaft.

3. The apparatus according to claim 2 wherein means are provided in said housing to drive a lubrication pump for said apparatus and a fuel pump for said prime mover through connection with said prime mover drive shaft.

4. The apparatus according to claim 3 wherein said starter/generator means includes a single main field rotor and respective stator windings therein.

5. A means for using an integrated starter/generator to start an aircraft auxiliary power unit having a gas turbine engine and to derive electric current therefrom after starting, said gas turbine engine having a rotatable drive shaft for transferring motive power to and from said gas turbine engine, said means including a housing removably mounted externally to said gas turbine engine and receiving therein an end portion of said rotatable drive shaft, said integrated starter/generator being disposed within said housing and having at least a d.c. input and an a.c. output for electric power, gear means within said housing, connected to said rotatable drive shaft and to said integrated starter/generator, for transferring motive power therebetween, said integrated starter/generator having a single electrodynamic rotatable structure for accomplishing both of the functions of starting said aircraft auxiliary power unit and deriving electric current therefrom after starting, said integrated starter/generator also including operating components for lubrication which serve to lubricate said gear means as well, said aircraft auxiliary power unit also including a fuel pump for supplying fuel to said gas turbine engine, and a control means for regulating the speed of said fuel pump, said control means being independent of the speed of rotation of said drive shaft, and said control means being an electric motor mounted externally of said housing and said electric motor also controlling said operating components for lubrication.

6. An aircraft auxiliary power unit including an integrated starter/generator portion and a gas turbine engine portion, each of said portions being contained within a separate housing for independent insertion and removal from an aircraft fuselage, said gas turbine portion having a rotatable drive shaft, a compressor and a turbine, said starter/generator portion providing the initial motive force through said drive shaft to said compressor and providing an electric current output from the motive force of said turbine, said starter/generator housing being removably attached to said gas turbine housing independently of removal of said gas turbine housing from said fuselage, said starter generator portion having a geared connection to said drive shaft and a single electrodynamic, rotatable structure for accomplishing both of the functions of providing said initial motive force and said electric current output, said rotatable structure having a geared portion for attachment to said drive shaft as part of said geared connection, and said geared connection having no intermediate speed reducing gear, between said drive shaft and the geared portion of said rotatable structure, and including means for providing fuel to said gas turbine and means for providing lubricating fluid to said starter generator portion, both of said means being operable independently of the rotational speed of said drive shaft.

* * * * *